US005884247A

United States Patent [19]

Christy

[11] Patent Number: 5,884,247

[45] Date of Patent: Mar. 16, 1999

[54] METHOD AND APPARATUS FOR AUTOMATED LANGUAGE TRANSLATION

[75] Inventor: Sam Christy, Cambridge, Mass.

[73] Assignee: Dialect Corporation, North Cambridge, Mass.

[21] Appl. No.: 740,654

[22] Filed: Oct. 31, 1996

[51] Int. Cl.[6] .......... G06F 17/28

[52] U.S. Cl. .......... 704/7; 704/4

[58] Field of Search .......... 704/1, 2, 3, 4, 704/5, 7, 9, 10, 277; 395/12

[56] References Cited

U.S. PATENT DOCUMENTS

| | | | |
|---|---|---|---|
| 5,020,021 | 5/1991 | Kaji et al. | 704/5 |
| 5,237,502 | 8/1993 | White et al. | 704/1 |
| 5,371,674 | 12/1994 | Obuchi | 704/5 |
| 5,373,441 | 12/1994 | Hirai et al. | 704/2 |
| 5,386,556 | 1/1995 | Hedin et al. | 707/4 |
| 5,426,583 | 6/1995 | Uribe-Echebarria Diaz De Mendibil | 704/2 |
| 5,490,061 | 2/1996 | Tolin et al. | 704/2 |
| 5,493,678 | 2/1996 | Arcuri et al. | 707/1 |
| 5,497,319 | 3/1996 | Chong et al. | 704/2 |
| 5,587,903 | 12/1996 | Yale | 704/9 |
| 5,659,765 | 8/1997 | Nii | 704/4 |

FOREIGN PATENT DOCUMENTS

| | | |
|---|---|---|
| 0 610 151 A1 | 8/1994 | European Pat. Off. . |
| 0 672 989 A2 | 9/1995 | European Pat. Off. . |
| 63-037472-A | 2/1988 | Japan . |
| WO08/05946 | 8/1988 | WIPO . |

OTHER PUBLICATIONS

Excerpt from Cole et al., Survey of the State of the Art in Human Language Technology (believed to have been published on the Internet prior to the filing date of the application).

Shubert et al., “The Translatability of Simplified English in Procedure Documents,” *1995 IEEE Int'l Professional Commun. Conf.*

Quinlan et al., “Sublanguage: Characteristics and Selection Guidelines for MT,” *Proc. Ann. Irish Conf. on Artif. Intell. and Cog. Sci.* (1992).

McCaskey et al., “Ez Japanese Writer,” *Computers and the Humanities* 26:301–305 (1992).

Pym, “Pre–Editing and the Use of Simplified Writing for MT: An Engineer's Experience of Operating an MT System,” *Translating and the computer 10* (1990).

“Regular Language Transcription Machine,” *IBM Technical Disclosure Bulletin*, Jun. 1982.

*Primary Examiner*—Joseph Thomas
*Attorney, Agent, or Firm*—Cesari and McKenna, LLP

[57] ABSTRACT

Language translation is accomplished by representing natural-language sentences in accordance with a constrained grammar and vocabulary structured to permit direct substitution of linguistic units in one language for corresponding linguistic units in another language. Preferably, the vocabulary is represented in a series of physically or logically distinct databases, each containing entries representing a form class as defined in the grammar. Translation involves direct lookup between the entries of a reference sentence and the corresponding entries in one or more target languages.

22 Claims, 2 Drawing Sheets

METHOD AND APPARATUS FOR AUTOMATED LANGUAGE TRANSLATION

FIELD OF THE INVENTION

The present invention relates generally to automated language translation, and in particular to a system for translating constrained linguistic constructs assembled in accordance with an exact grammar.

BACKGROUND OF THE INVENTION

Since the time when improvements in transportation began to significantly reduce the inconvenience and cost of cross-border travel, the desirability of universal communication has been recognized. In the 1960s, for example, international efforts were made to promote Esperanto as a universal language. While that effort ultimately failed, the large number of fluent speakers—between 1 and 15 million worldwide—and the scope of the efforts illustrate the problem's importance. Esperanto did not succeed because it required acquisition of both a new grammar and a new vocabulary, the latter posing a far greater challenge for would-be speakers.

The improving ease and speed with which information can now be transmitted worldwide has augmented the need for universal communication. Current efforts have focused most heavily on automated translation among languages. Systems now in use generally store, in a source and a target language, millions of frequently used words, phrases and combinations, relying for accuracy and robustness on the occurrences in the text to be translated. Such systems are by definition incomplete, since no system can possibly store every possible word combination, and their usefulness varies with the linguistic idiosyncracies of their designers and users. It is almost always necessary for a human to check and modify the output translation. These systems also translate one word at a time (and so operate slowly), and require a separate database unique to each target language. Moreover, because they are programmed to recognize distinctive language characteristics and their unique mappings from one language to another, each translation must be done individually. In other words, the time required for multiple translations is the sum of the times for each translation performed individually.

Translation is difficult for numerous reasons, including the lack of one-to-one word correspondences among languages, the existence in every language of homonyms, and the fact that natural grammars are idiosyncratic; they do not conform to an exact set of rules that would facilitate direct, word-to-word substitution. It is toward a computational "understanding" of these idiosyncracies that many artificial-intelligence research efforts have been directed, and their limited success testifies to the complexity of the problem.

SUMMARY OF THE INVENTION

The present invention provides an artificial grammar for expressing the thoughts and information ordinarily conveyed in a natural grammar, but in a structured format amenable to automated translation. Sentences in accordance with the invention are constructed based on a fixed series of rules applied to an organized natural vocabulary. The grammar is clear in the sense of being easily understood by native speakers of the vocabulary and complex in its ability to express sophisticated concepts, but, because sentences are derived from an organized vocabulary according to fixed rules, they can be readily translated from one language to another. Preferably, the vocabulary is represented in a series of physically or logically distinct databases, each containing entries representing a form class as defined in the grammar. Translation involves direct lookup between the entries of a reference sentence and the corresponding entries in one or more target languages.

Unlike natural languages, the invention employs a finite (although flexible and extensible) lexicon, an exact set of form classes and a finite and exact set of rules for sentence formation. Starting with a term from one of four form classes, sentences can be constructed by iterative application of four expansion rules that govern the manner in which terms from the various classes can be combined. The resulting "sentences," while unlike those of the natural language they are intended to represent, can nonetheless accurately and comprehensibly represent the full range of meanings of natural-language sentences. The invention exploits the relative ease of learning a new grammar, particularly one that is highly constrained to a few precise rules, as compared with learning a new vocabulary. As a result, after becoming familiar with this grammar, the user can easily compose sentences in the manner prescribed by the present invention.

Accordingly, to use the invention, a natural-language sentence is translated or decomposed into the (typically) simpler grammar of the invention but preserving the original vocabulary. Although it is possible to accomplish this with some degree of automation, the full benefits of the invention are most directly realized by manual development—either by primary translation or direct composition—in the invention's grammar, which is easily learned and applied. And because translation involves simple substition of equivalent entries from different languages, multiple-language translation of an input sentence is achieved almost instantly.

The translated output is as easily understood by a native speaker of the target language as the input was to the author of the original text. Thus, it is possible to carry out "conversations" in the grammar of the invention by formulating statements according to the grammar, passing these to an interlocutor for translation and response, and translating the interlocutor's responses. For example, a business person native to the United States and without knowledge of German can conduct a meeting with native German speakers using as a translation device a laptop computer configured in accordance with the invention, exchanging thoughts via the computer. Indeed, the same thoughts may be simultaneously broadcast to multiple interlocutors each speaking a different language, with their individual responses simultaneously and multiply translated as well. Correspondents can exchange messages by e-mail, in their native languages, simply by formulating the messages in accordance with the invention's grammar; recipients speaking different languages who have e-mail systems implementing the invention receive the message translated into their native languages, and their responses are automatically translated into the original sender's language upon their arrival; in this way, each correspondent is exposed only his or her native language.

The invention is advantageously employed even in situations demanding an ultimate output in a natural language, since translation to this format is readily accomplished. For example, a news reporter might file a story worded in the invention's grammar for dissemination to numerous bureaus serving different national audiences. The story is instantly translated into the appropriate languages upon arrival at the different bureaus, where it may then be further refined into a form suitable for communication to the audience. The skills required if further translation is desired are essentially editorial in nature, and thus require less specialized training than would be necessary, for example, for true language translation; indeed, communications media already employ personnel to carry out the similar tasks of editing and revising raw news material taken from wire services.

In accordance with the invention, sentences are composed of "linguistic units," each of which may be one or a few words, from the allowed form classes. These classes are "things" or nominal terms that connote, for example, people, places, items, activities or ideas; "connectors" that specify relationships between two (or more) nominal terms; "descriptors" modifying the state of one or more nominal terms; and "logical connectors" establishing sets of the nominal terms. The list of all allowed entries in all four classes represents the global lexicon of the invention. To construct a sentence in accordance with the invention, entries from the form classes are combined according to four expansion rules detailed below. These rules can be followed explicitly in a stepwise fashion to produce sentences, but more typically, once the user is accustomed to the grammar, sentences are constructed by "feel" and, if necessary, subsequently tested for conformity with the expansion rules.

Thus, the invention solves the three obstacles noted earlier that have prevented the emergence of truly robust translation systems. The idiosyncratic nature of different grammars is overcome by substituting a fixed grammar, and the one-to-one correspondence problem is addressed through a specialized and finite database. Homonyms are handled by explicitly labeling the different senses of a word and requiring explicit selection of the intended sense. These capabilities allow the invention to be conveniently and inexpensively applied to many languages, even exotic ones; current systems, by contrast, are directed almost exclusively to the major languages due to the expense inherent in their design.

A representative hardware implementation includes a series of logically or physically distinct electronic databases in which the vocabulary is stored, a computer memory partition for accepting an input in a reference language and structured in accordance with the invention; and analysis means (generally a processor operated in accordance with stored computer instructions) for (i) addressing the databases with the input to retrieve entries in the target language corresponding thereto, and (ii) translating the sentence by replacing the input with the identified target entries.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
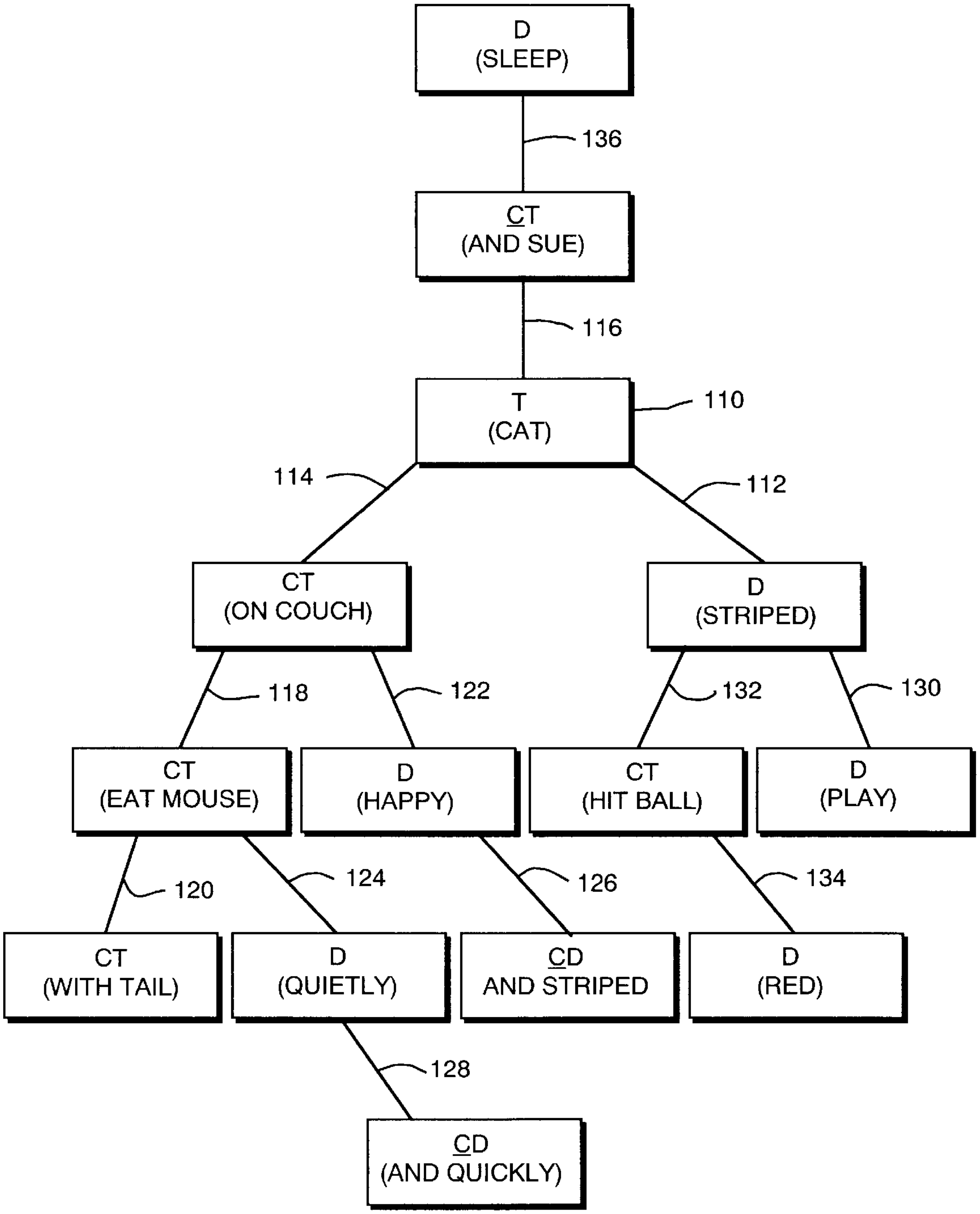
FIG. 1 schematically illustrates application of the expansion rules of the present invention.

The system of the present invention makes use of a lexicon and a constrained set of grammar rules. The lexicon comprises linguistic units divided into four classes. Each linguistic unit is (1) a single word, such as "dog" or "government"; or (2) a combination of words, such as "parking space" or "prime minister"; or (3) a proper name; or (4) a word with a definition unique to the invention; or (5) one form of a word with multiple meanings. In the latter case, each definition of the word represents a different linguistic unit, the various definitions may appear as entries in different form classes. For purposes of automation, each definition is distinguished, for example, by the number of periods appearing at the end of the word. The entry for the first (arbitrarily designated) definition is listed with no period, the entry representing the second definition is listed with one period at its end, and so on. Alternatively, different word senses can be identified numerically, e.g., using subscripts.

Words unique to the invention may make up a very small proportion of the total lexicon, and none of these words is specific to the invention or alien to the natural language upon which it is based. Instead, invention-specific words are broadened in connotation to limit the overall number of terms in the lexicon. For example, in a preferred implementation, the word "use" is broadened to connote employment of any object for its primary intended purpose, so that in the sentence "Jake use book," the term connotes reading. The word "on" may be used to connote time (e.g., (i go-to ballegame) on yesterday). If desired for ease of use, however, the invention-specific words can be eliminated altogether and the lexicon expanded accordingly.

The invention divides the global lexicon of allowed terms into four classes: "things" or nominal terms that connote, for example, people, places, items, activities or ideas, identified herein by the code T; "connectors" that specify relationships between two (or more) nominal terms (including words typically described as prepositions and conjunctions, and terms describing relationships in terms of action, being, or states of being), identified herein by C; "descriptors" modifying the state of one or more nominal terms (including words typically described as adjectives, adverbs and intransitive verbs), identified herein by D; and "logical connectors" establishing sets of the nominal terms, identified herein by C̲. Preferred lists of nominal terms, connectors and descriptors are set forth in Appendices 1–3, respectively. The preferred logical connectors are "and" and "or."

Naturally, the lexicon cannot and does not contain a list of possible proper names; instead, proper names, like other words not recognized by the invention, are returned inside angle brackets to indicate that translation did not occur. The system also does not recognize verb tenses; connectors are phrased in the present tense, since tense is easily understood from context. Tense may nonetheless be indicated, however, by specifying a time, day and/or date.

Sentences in accordance with the invention are constructed from terms in the lexicon according to four expansion rules. The most basic sentences proceed from one of the following three constructions (any of which can be created from a T term in accordance with the expansion rules set forth hereinbelow). These structures, which represent the smallest possible sets of words considered to carry information, are the building blocks of more complex sentences. Their structural simplicity facilitates ready translation into conversational, natural-language sentences; thus, even complex sentences in accordance with the invention are easily transformed into natural-language equivalents through modular analysis of the more basic sentence components (a process facilitated by the preferred representations described later).

Basic Structure 1 (BS1) is formed by placing a descriptor after a nominal term to form the structure TD. BS1 sentences such as "dog brown" and "Bill swim" readily translate into the English sentence "the dog is brown" (or the phrase "the brown dog") and "Bill swims."

BS2 is formed by placing a connector between two nominal terms to form the structure TCT. BS2 sentences such as "dog eat food" readily translate into English equivalents.

BS3 is formed by placing a logical connector between two nominal terms to form a series represented by the structure T$\underline{C}$T . . . The series can be a single conjunction, such as "Bob and Ted," or compound structure such as "Bob and Ted and Al and Jill" or "red or blue or green."

A sentence comprising one or more of the basic structures set forth above may be expanded using the following rules:

Rule I: To a nominal term, add a descriptor (T$\rightarrow$TD)

In accordance with Rule I, any linguistic unit from the nominal class can be expanded into the original item followed by a new item from the descriptor class, which modifies the original item. For example, "dog" becomes "dog big." Like all rules of the invention, Rule I is not limited in its application to an isolated nominal term (although this is how BS1 sentences are formed); instead, it can be applied to any nominal term regardless of location within a larger sentence. Thus, in accordance with Rule I, $TD_1 \rightarrow (TD_2)D_1$. For example, "dog big" becomes "(dog brown) big" (corresponding to English sentence, "the brown dog is big").

The order of addition may or may not be important in the case of consecutive adjectives, since these independently modify T; for example, in "(dog big) brown," the adjective "big" distinguishes this dog from other dogs, and "brown" may describe a feature thought to be otherwise unknown to the listener. The order of addition is almost always important where a D term is an intransitive verb. For example, expanding the TD sentence "dog run" (corresponding to "the dog runs" or "the running dog") by addition of the descriptor "fast" forms, in accordance with Rule I, "(dog fast) run" (corresponding to "the fast dog runs"). To express "the dog runs fast," it is necessary to expand the TD sentence "dog fast" with the descriptor "run" in the form "(dog run) fast."

Applying expansion Rule I to the structure BS2 produces TCT$\rightarrow$(TD)CT. For example, "dog eat food" becomes "(dog big) eat food." Rule I can also be applied to compound nominal terms of the form T$\underline{C}$T, so that a structure of form BS3 becomes T$\underline{C}$T$\rightarrow$(TCT)D. For example, "mother and father" becomes "(mother and father) drive." In this way, multiple nominal terms can be combined, either conjunctively or alternatively, for purposes of modification. It should also be noted that verbs having transitive senses, such as "drive,"are included in the database as connectors as well as descriptors. Another example is the verb "capsize," which can be intransitive ("boat capsize") as well as transitive ("captain capsize boat").

Rule II*a*: To a nominal term, add a connector and another nominal term (T$\rightarrow$TCT).

In accordance with Rule II*a*, any linguistic unit from the nominal class can be replaced with a connector surrounded by two nominal entries, one of which is the original linguistic unit. For example, "house" becomes "house on hill." Applying expansion Rule II*a* to BS1 produces TD$\rightarrow$(TCT) D; for example, "gloomy house" becomes "(house on hill) gloomy," or "the house on the hill is gloomy."

Rule II*a* can be used to add a transitive verb and its object. For example, the compound term "mother and father" can be expanded to "(mother and father) drive car."

Rule II*b*: To a nominal term, add a logical connector and another nominal term (T$\rightarrow$T$\underline{C}$T).

In accordance with Rule II*b*, any linguistic unit from the nominal class can be replaced with a connector surrounded by two nominal entries, one of which is the original linguistic unit. For example, "dog" becomes "dog and cat."

Again, for purposes of Rule II*a* and Rule II*b*, a nominal term can be a composite consisting of two or more nominal terms joined by a connector. For example, the expansion "(john and bill) go-to market" satisfies Rule II*a*. Subsequently applying Rule I, this sentence can be further expanded to "((john and bill) go-to market) together.

Rule III: To a descriptor, add a logical connector and another descriptor (D$\rightarrow$D$\underline{C}$D).

In accordance with Rule III, a descriptor can be replaced with a logical connector surrounded by two descriptors, one of which is the original. For example, "big" becomes "big and brown." Applying expansion Rule III to BS1 produces TD$\rightarrow$T(D$\underline{C}$D); for example "dog big" (equivalent to "the dog is big," or "the big dog") becomes "dog (big and brown)" (equivalent to "the dog is big and brown" or "the big brown dog").

The manner in which these rules are applied to form acceptable sentences in accordance with the invention is shown in FIG. 1. Beginning with a nominal term such as cat, shown at 110, any of the three basic structures can be formed by following expansion Rules I, II*a* and II*b* as shown at 112, 114, 116, respectively, to produce "cat striped" (BS1), "cat on couch" (BS2) or "cat and Sue" (BS3). Iterative application of expansion rule II*a* at 118 and 119 produces structures of the forms $TC_1T_1 \rightarrow (TC_1T_1)C_2T_2$ or "((cat on couch) eat mouse)" and $(TC_1T_1)C_2T_2 \rightarrow ((TC_1T_1)C_2T_2)C_3T_3$ or "(((cat on couch) eat mouse) with tail)." Expansion rule I can be applied at any point to a T linguistic unit as shown at 122 (to modify the original T, cat, to produce "(happy cat) on couch") and 124 (to modify "eat mouse"). Rule III can also be applied as shown at 126 (to further modify cat to produce "(((happy and striped) cat) on couch)") and 128 (to further modify "eat mouse").

Expansion Rule I can be applied iteratively as shown at 112, 130 to further modify the original T (although, as emphasized at 130, a descriptor need not be an adjective). Expansion Rule II*a* is available to show action of the modified T (as shown at 132), and Rule I can be used to modify the newly introduced T (as shown at 134). Rule I can also be used to modify (in the broad sense of the invention) a compound subject formed by Rule II*b*, as shown at 136.

The order in which linguistic units are assembled can strongly affect meaning. For example, the expansion $TC_1T_1 \rightarrow (TC_1T_1)C_2T_2$ can take multiple forms. The construct "cat hit (ball on couch)" conveys a meaning different from "cat hit ball (on couch)." In the former the ball is definitely on the couch, and in the latter the action is taking place on the couch. The sentence "(john want car) fast" indicates that the action should be accomplished quickly, while "(john want (car fast))" means that the car should move quickly.

A more elaborate example of the foregoing expansion rules, which illustrates the utility of the invention in representing a natural-language discussion, appears in the following table:

TABLE 1

Zairian health officials said 97 people have died from the Ebola virus so far. Jean Tamfun, a virologist, who helped identify the virus in 1976, criticized the government's quarantines and roadblocks as ineffective. On Saturday the quarantine on the Kikwith region was offically lifted.

health-official/s of zaire
*say*
people 97
*dead
*because-of*
virus named ebola

TABLE 1-continued

| |
|---|
| jean-tamfun be* |
| virologist in zaire |
| he help* |
| scientist/s identify* |
| virus named ebola |
| *in 1976 |
| jean-tamfun criticize* |
| government of zaire |
| he say* |
| quarantine/s ineffective |
| *and* |
| roadblock/s ineffective |
| government end* |
| quarantine of* |
| region named kikwit |
| *on saturday |

Figure 2:
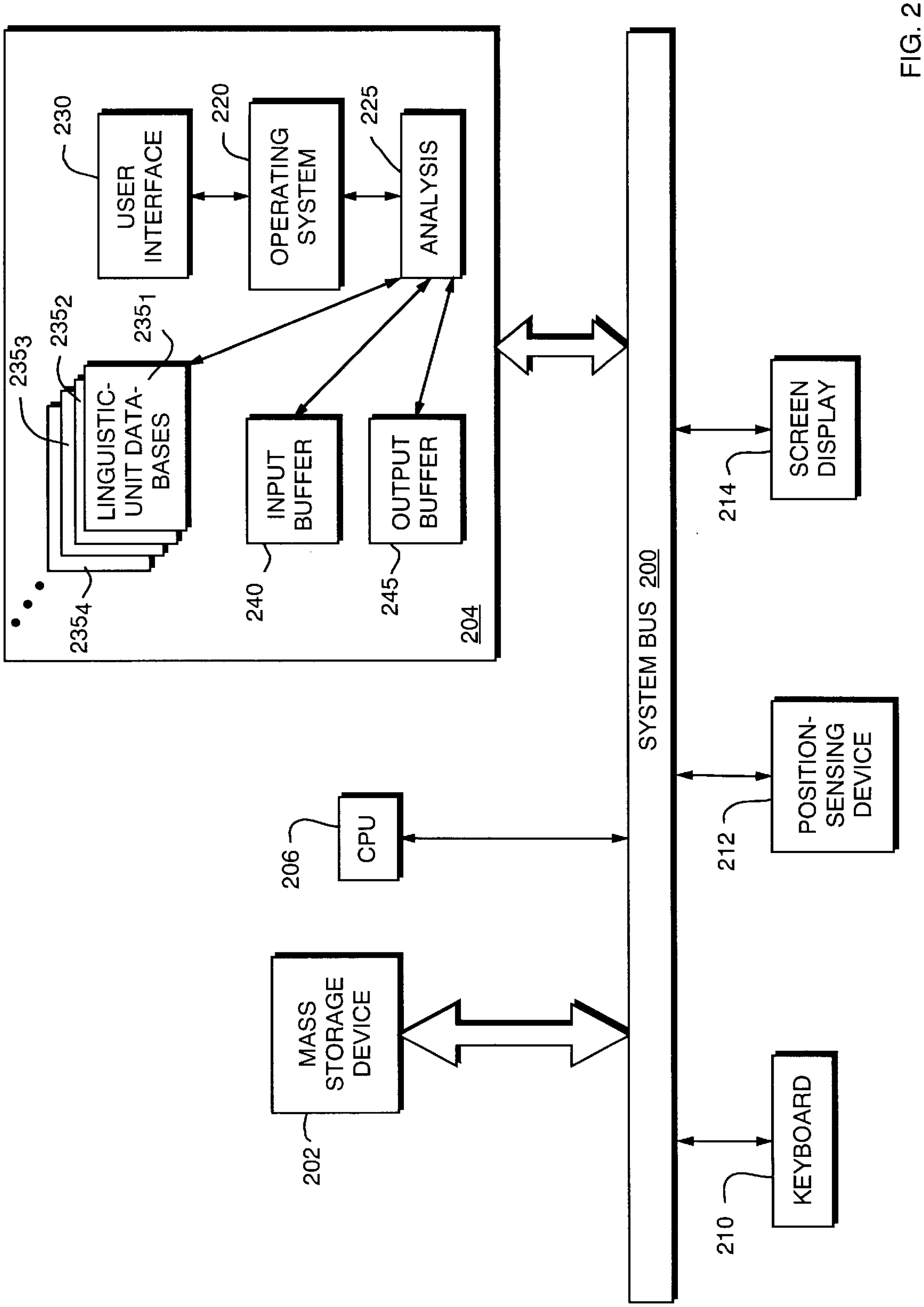
FIG. 2 is a schematic representation of a hardware system embodying the invention.

A representative hardware implementation of the invention is shown in FIG. 2. As indicated therein, the system includes a main bidirectional bus 200, over which all system components communicate. The main sequence of instructions effectuating the invention, as well as the databases discussed below, reside on a mass storage device (such as a hard disk or optical storage unit) 202 as well as in a main system memory 204 during operation. Execution of these instructions and effectuation of the functions of the invention is accomplished by a central-processing unit ("CPU") 206.

The user interacts with the system using a keyboard 210 and a position-sensing device (e.g., a mouse) 212. The output of either device can be used to designate information or select particular areas of a screen display 214 to direct functions to be performed by the system.

The main memory 204 contains a group of modules that control the operation of CPU 206 and its interaction with the other hardware components. An operating system 220 directs the execution of low-level, basic system functions such as memory allocation, file management and operation of mass storage devices 202. At a higher level, an analysis module 225, implemented as a series of stored instructions, directs execution of the primary functions performed by the invention, as discussed below; and instructions defining a user interface 230 allow straightforward interaction over screen display 214. User interface 230 generates words or graphical images on display 214 to prompt action by the user, and accepts user commands from keyboard 210 and/or position-sensing device 212.

Main memory 204 also includes a partition defining a series of databases capable of storing the linguistic units of the invention, and representatively denoted by reference numerals $\mathbf{235_1}$, $\mathbf{235_2}$, $\mathbf{235_3}$, $\mathbf{235_4}$. These databases 235, which may be physically distinct (i.e., stored in different memory partitions and as separate files on storage device 202) or logically distinct (i.e., stored in a single memory partition as a structured list that may be addressed as a plurality of databases), each contain all of the linguistic units corresponding to a particular class in at least two languages. In other words, each database is organized as a table each of whose columns lists all of the linguistic units of the particular class in a single language, so that each row contains the same linguistic unit expressed in the different languages the system is capable of translating. In the illustrated implementation, nominal terms are contained in database $\mathbf{235_1}$, and a representative example of the contents of that database in a single language (English)—that is, the contents of one column in what would be a multi-column working database—appears in Table 2; connectors are contained in database $\mathbf{235_2}$, an exemplary column of which appears in Table 3; descriptors are contained in database $\mathbf{235_3}$, an exemplary column of which appears in Table 4; and logical connectors (most simply, "and" and "or") are contained in database $\mathbf{235_4}$.

TABLE 2

| NOMINATIVE TERMS | | | | |
|---|---|---|---|---|
| actor | argument | bathrobe | boat | butter |
| address | arm | bathtub | body | butterfly |
| advertise- | army | battery | bolivia | button |
| ment | arrival | beach | bomb | cabbage |
| advice | art | bean | bone | cabin |
| africa | artist | bear | book | cafe |
| afternoon | asia | beard | border | cake |
| age | attic | bed | bottle | camel |
| aim | august | bedroom | bottom | camera |
| air | aunt | bee | bowl | camp |
| airplane | australia | beef | box | canada |
| airport | austria | beer | boy | canal |
| algeria | author | beet | bracelet | candle |
| altitude | authority | beginning | brain | cane |
| aluminum | avalanche | behavior | brake | capital |
| ambassador | baby | belgium | brass | captain |
| amount | back | bell | brazil | car |
| animal | backpack | belt | bread | cardboard |
| ankle | bag | benefit | breakfast | cargo |
| answer | baker | beverage | breath | carpenter |
| ant | balcony | bicycle | brick | carpet |
| apartment | ball | bill | bridge | carrot |
| appetite | banana | billiard | broom | cash |
| apple | bandage | bird | brother | cat |
| appointment | bank | birth | brush | cattle |
| | barley | birthday | building | cauliflower |
| apricot | barn | bladder | bulgaria | cellar |
| april | barrel | blanket | bullet | cemetery |
| acchitect | basket | blood | bus | chain |
| argentina | bath | blouse | butcher | chair |
| cheek | copy | dinner | export | germany |
| cheese | corkscrew | direction | eye | gift |
| chemistry | corn | disease | face | girl |
| cherry | cost | dish | factory | glass |
| chess | cotton | distance | fall | glasses |
| chest | couch | document | family | glove |
| chicken | country | dog | farm | glue |
| child | courage | donkey | father | goat |
| chile | cousin | door | february | god |
| chin | cow | drawing | ferry | gold |
| china | cracker | dream | fig | goose |
| chocolate | crane | dress | finger | government |
| christmas | cream | driver | fingernail | grape |
| church | crib | drum | finland | grapefruit |
| cigar | crime | duck | fire | grass |
| cigarette | cuba | dust | fish | greece |
| circle | cucumber | eagle | fist | group |
| citizen | cup | ear | flea | guard |
| clock | curtain | earring | flood | guest |
| clothing | czechoslov | earthquake | floor | guide |
| cloud | akia | ecuador | flour | gun |
| clove | damage | education | flower | gymnastics |
| club | dance eel | flute | hail | |
| coal | danger | egg | fly | hair |
| coat | date | egypt | food | hairdresser |
| cockroach | daughter | elbow | foot | half |
| cocoa | day | electricity | football | hammer |
| coffee | death | elevator | forest | hand |
| collar | debt | end | fork | handkerchief |
| colombia | december | enemy | fox | |
| color | decision | energy | france | harbor |
| comb | degree | engine | friday | harvest |
| comfort | denmark | engineer | friend | hat |
| competition | dentist | england | frog | he |
| computer | departure | entrance | front | head |
| concert | desert | envelope | fruit | health |
| condition | dessert | ethiopia | funeral | heart |
| connection | diarrhea | europe | game | heel |
| conversation | dictionary | excuse | garden | here |
| | digestion | exhibition | garlic | highway |

TABLE 2-continued

| NOMINATIVE TERMS | | | | |
|---|---|---|---|---|
| cook | dining- | exit | gasoline | hole |
| copper | room | expense | gauge | holiday |
| holland | key | luggage | movie | pain |
| honey | kidney | lunch | mushroom | painting |
| horse | kind | lung | mustard | pair |
| horse-race | king | machine | nail | pakistan |
| hospital | kitchen | magazine | nail-file | pancake |
| hotel | knee | magic | name | panic |
| hour | knife | maid | nature | pants |
| house | kuwait | mail | neck | paper |
| hungary | lace | malaysia | necklace | parachute |
| husband | ladder | malta | needle | parents |
| I | lake | man | neighbor | parking |
| ice | lamb | map | nepal | part |
| ice-cream | language | march | netherlands | partridge |
| iceland | lawyer | market | new- | passport |
| idea | lead | marriage | zealand | pea |
| import | leaf | match | newspaper | peace |
| india | leather | mattress | nicaragua | pear |
| indonesia | lebanon | may | nigeria | peasant |
| information | leg | meat | night | pen |
| ink | lemon | medicine | noodle | pencil |
| insect | letter | meeting | noon | people |
| insurance | liberia | melon | north- | pepper |
| interpreter | library | member | america | persia |
| invention | libya | memorial | north-pole | peru |
| iran | license | metal | norway | pharmacy |
| iraq | life | mexico | nose | philippines |
| ireland | light | middle | november | physician |
| iron | light-bulb | milk | number | piano |
| island | lightning | minute | nurse | picture |
| israel | lime | mistake | nut | pig |
| it | linen | monday | oak | pigeon |
| italy | lion | money | oar | pillow |
| january | lip | monkey | oats | pilot |
| japan | liquid | month | october | pin |
| jewel | liver | moon | office | pine-tree |
| job | living-room | morning | oil | pipe |
| joke | lobster | morocco | olive | plant |
| jordan | lock | mosquito | onion | platform |
| juice | look | mother | orange | play |
| july | loom | mountain | ore | playing- |
| june | love | mouse | ox | card |
| kenya | luck | mouth | package | pleasure |
| plum | room | skin | story | tin |
| pocket | root | skis | stove | tire |
| poison | rope | sky | street | toast |
| poland | rubber | sled | student | tobacco |
| police- | rumania | smell | subway | today |
| officer | russia | smoke | sugar | toe |
| porter | rust | snake | summer | toilet |
| portual | saddle | snow | sun | tomato |
| post-office | saddness | soap | sunday | tomorrow |
| postcard | safety | socks | surprise | tongue |
| pot | saftey-belt | soda | swamp | tool |
| potato | sailor | soldier | sweden | tooth |
| powder | salt | solution | switzerland | toothbrush |
| prison | sand | son | syria | top |
| problem | saturday | song | table | towel |
| property | sauce | sound | tail | town |
| purse | saudi- | soup | tailor | toy |
| quarter | arabia | south-africa | taste | train |
| queen | squsage | south- | tax | tree |
| question | scale | america | tea | trip |
| rabbit | scarf | south-pole | teacher | trouble |
| radio | school | soviet- | telephone | truth |
| rag | science | union | television | tuesday |
| rain | scissors | space | tent | tunisia |
| raincoat | scotland | spain | test | turkey |
| rat | screw | spice | thailand | tv-show |
| razor | sea | spoon | theater | typewriter |
| receipt | self | spring | they | umbrella |
| record- | september | staircase | thief | uncle |
| player | shape | stamp | thigh | united- |
| refrigerator | she | star | thing | states |
| religion | sheep | starch | thirst | uruguay |
| rent | shirt | station | thread | us |

TABLE 2-continued

| NOMINATIVE TERMS | | | | |
|---|---|---|---|---|
| restaurant | shoe | steak | throat | vaccination |
| result | shoulder | steel | thumb | vegetable |
| rice | side | stick | thunder | velvet |
| ring | signature | stock- | thursday | venezuela |
| risk | silk | market | ticket | victim |
| river | silver | stomach | tie | view |
| rocket | sister | stone | tiger | village |
| roll | situation | store | time | vinegar |
| roof | size | storm | timetable | violin |
| voice | water | weight | window | work |
| waiter | we | wheat | winter | year |
| wall | weather | where? | woman | yesterday |
| war | wedding | who? | wood | you |
| waste | wednesday | wife | wool | yugoslavia |
| watch | week | wind | word | |

TABLE 3

| CONNECTORS | | | | |
|---|---|---|---|---|
| able-to | call | from | mix | shoot |
| about | called | from | more-than | should |
| above | capsize | fry | move | sing |
| across | capture | give | near | smell |
| afraid-of | carry | go-in | need | speak |
| after | catch | go-through | occupy | steal |
| against | cause | go-to | of | sting |
| allow | change | hang | on | stop |
| answer | climb | hate | outside | study |
| arrest | close | have | pay | take |
| arrive-at | cook | hear | play | teach |
| ask | count | help | prepare | throw |
| at | cut | hit | print | to |
| bake | deal-with | hunt | promise | touch |
| be | decrease | if | prove | translate |
| because | defeat | in | pull | try |
| become | deliver | in-front-of | push | turn-off |
| before | discuss | in-order-to | put | turn-on |
| begin | down | include | read | under |
| behind | drink | increase | reduce | understand |
| believe | drive | kill | refuse | until |
| bet | drop | kiss | remember | use |
| betray | eat | know | repeat | value |
| between | examine | learn | ride | visit |
| blame | explain | leave | roast | want |
| bother | find | like | say | wash |
| break | finish | live-in | see | while |
| bring | fix | look-for | sell | win |
| burn | for | made-of | send | with |
| but | for | make | sew | work-for |
| buy | forget | meet | shave | write |

TABLE 4

| DESCRIPTORS | | | | |
|---|---|---|---|---|
| abroad | clean | flat | long | round |
| absent | clear | fly | malignant | run |
| again | cold | forbidden | maybe | sad |
| agree | complain | foreign | mean | safe |
| alive | continue | fragile | more | short |
| all | correct | free | much | sick |
| almost | cough | fresh | mute | similar |
| alone | crazy | fun | mutual | sit |
| also | cry | funny | my | sleep |
| always | curious | glad | nervous | slow |
| angry | damp | good | neutral | slowly |
| another | dangerous | goodbye | never | small |
| any | dark | green | new | smile |
| argue | dead | grey | next | soft |
| artificial | deaf | grow | nice | some |
| automatic | decrease | guilty | north | sometimes |

TABLE 4-continued

| DESCRIPTORS | | | | |
|---|---|---|---|---|
| available | deep | hang | not | sour |
| backward | defective | happen | now | south |
| bad | different | happy | often | special |
| bashful | difficult | hard | okay | stand |
| beautiful | dirty | healthy | old | strong |
| begin | drop | heavy | open | sweet |
| black | drown | hungry | our | swim |
| blind | dry | illegal | permitted | talk |
| blond | early | important | pink | tall |
| blue | east | increase | play | thanks |
| boil | easy | intelligent | please | there |
| boring | empty | interesting | poor | thick |
| born | enough | jealous | portable | thin |
| brave | expensive | kiss | possible | think |
| broken | expire | large | previous | tired |
| brown | extreme | last | quiet | together |
| burn | far | late | red | too-much |
| capsize | fast | laugh | rest | transparent |
| careful | fat | lazy | rich | travel |
| change | few | left | right | ugly |
| cheap | first | legal | ripe | upstairs |
| urgent | warm | wet | worry | young |
| wait | weak | white | wrong | your |
| walk | west | why? | yellow | |

An input buffer 240 receives from the user, via keyboard 210, an input sentence that is preferably structured in accordance with the invention and formatted as described below. In this case, analysis module 225 initially examines the input sentence for conformance to the structure. Following this, module 225 processes single linguistic units of the input sentence in an iterative fashion, addressing the databases to locate the entries corresponding to each linguistic unit in the given language, as well as the corresponding entries in the target language. Analysis module 225 translates the sentence by replacing the input entries with the entries from the target language, entering the translation into an output buffer 245 whose contents appears on screen display 214.

It must be understood that although the modules of main memory 204 have been described separately, this is for clarity of presentation only; so long as the system performs all necessary functions, it is immaterial how they are distributed within the system and the programming architecture thereof.

In order to facilitate convenient analysis by module 225, input sentences are preferably structured in a characteristic, easily processed format that facilitates both straightforward identification of individual linguistic units and simple verification that the the sequence of units qualifies as a legitimate sentence in accordance with the expansion rules of the invention. In one approach ("portrait form"), each linguistic unit of a sentence appears in a separate line. If an expansion has been applied, an asterisk (*) is used to mark where the expansion occurred; that is, the * is used to connect basic sentence structures together to form larger sentences. For example, drawing from the entries in FIG. 1, cat striped
*hit*
ball red represents the results of steps 132 and 134.

Alternatively, the sentence can be expressed in an algebraic ("landscape") format where expansions are identified by enclosing the expansion terms in parentheses:

(cat striped) hit (ball red)

In either case, the user's input is treated as a character string, and using standard string-analysis routines, module 225 identifies the separate linguistic units and the expansion points. It then compares these with templates corresponding to the allowed expansion rules to validate the sentence, following which database lookup and translation take place. If the sentence fails to conform to the rules of the invention, module 225 alerts the user via screen display 214.

In accordance with either of these representation formats, plurals in English are noted by adding "/s" to the end of a singular noun (e.g., "nation/s"). In other languages, the most generic method of forming plurals is used; for example, in French, "/s" is added as in English, but in Italian, "/i" is added. Numbers are expressed numerically.

Alternatively, analysis module 225 can be configured to process unformatted input sentences. To accomplish this, module 225 looks up each input word (or, as appropriate, groups of words) in databases 235 and builds a representation of the sentence in terms of the linguistic classes comprising it—that is, replacing each unit with its linguistic class symbol. Module 225 then assesses whether the resulting sequence of classes could have been generated in accordance with the allowed expansion rules, and if so, groups the linguistic units to facilitate lookup and translation. The output is provided either in an unstructured format corresponding to the input or in one of the formats set forth above. The latter form of output is preferred, since word strings in one language rarely correspond sensibly to word strings in another language produced solely by substitution; it is generally easier to comprehend output in a form that isolates the linguistic units and highlights expansions.

The invention may incorporate additional features to simplify operation. For example, as noted above, words having multiple senses are differentiated by ending periods; naturally, the number of periods following a particular sense of the word represents an arbitrary choice. Accordingly, an additional database 235 can comprise a dictionary of words having multiple meanings, with the invention-recognized format of each sense of the word set next to the various definitions. User interface 230 interprets the user's clicking on one of the definitions as selection thereof, and enters the proper encoding of the word into input buffer 240.

Similarly, because considerations of economy and speed of operation limit the overall desirable size of the databases, one of the databases 235 can be set up as a thesaurus that gives the closest invention-recognized linguistic unit to an unrecognized input word. In operation, when following an unsuccessful attempt by analysis module 225 to locate a word in the databases, module 225 can be programmed to consult the thesaurus database 235 and return a list of words that do, in fact, appear in the linguistic-unit databases.

Module 225 can also include certain utilities that recognize and correct (e.g., after approval by the user) frequently made errors in sentence construction. For example, the present invention ordinarily indicates possession by a named person using the verb "to have"; thus, the sentence "Paul's computer is fast" is represented (in algebraic format) as "paul have (computer fast)" or "(computer of paul) fast"; if the person is unnamed, the usual possessive pronouns may be used (e.g., "(computer my) fast"). Thus, module 225 can be configured to recognize constructions such as "Paul's"and return the appropriate construction in accordance with the invention.

It will therefore be seen that the foregoing represents a convenient and fast approach to translation among multiple languages. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits, or as mixed hardware-software combinations.

What is claimed is:

1. A method of translating information from a first language into a second language, the method comprising:

a. providing reference and target sets of nominal, connector, and descriptor databases in reference and target languages, each nominal database comprising a series of nominal entries, each connector database comprising a series of connector entries each specifying a relationship between at least two nominal terms, and each descriptor database comprising a series of descriptor entries describing nominal entries, the entries of the reference set of databases corresponding to the entries of the target set of databases;

b. generating a sentence in the reference language from a plurality of entries from the reference set of databases according to rules defining a constrained grammar;

c. addressing the target set of databases with the reference entries to retrieve target entries corresponding thereto; and d. translating the sentence by directly substituting the reference entries with the target entries.

2. The method of claim 1 further comprising the step of providing logical-connector databases in reference and target languages, each logical-connector database comprising a series of entries establishing sets.

3. The method of claim 2 wherein the sentence is generated by selecting an item from the nominal database and expanding the sentence by applying at least one of the rules:

a. to a nominal entry, add a descriptor entry from the descriptor database;

b. to a nominal entry, add a connector entry from the connector database and another nominal entry from the nominal database;

c. to a nominal entry, add a logical connector from the logical-connector database and another nominal entry from the nominal database; and d. to a descriptor entry, add a logical-connector entry from the logical-connector database and another descriptor entry from the descriptor database.

4. The method of claim 2 wherein the logical-connector database comprises the entries and, or.

5. The method of claim 1 wherein the nominal entries name a person, place, thing, activity or idea.

6. The method of claim 5 wherein the nominal entries include the terms set forth in Table 2.

7. The method of claim 1 wherein the connector entries show action, being or state of being.

8. The method of claim 7 wherein the connector entries include the terms set forth in Table 3.

9. The method of claim 1 wherein the descriptor entries describe a quality, quantity, state or type of a nominal entry.

10. The method of claim 5 wherein the descriptor entries include the entries set forth in Table 4.

11. Apparatus for translating information from a first language into a second language, the apparatus comprising:

a. first database means comprising a series of nominal entries in a reference and at least one target language;

b. second database means comprising a series of connector entries in a reference and at least one target language, the connector entries each specifying a relationship between at least two nominal entries;

c. third database means comprising a series of descriptor entries in a reference and at least one target language, the descriptor entries describing nominal entries;

d. means for accepting an input in the reference language, the input comprising entries from the database means organized in accordance with rules defining a constrained grammar; and e. analysis means for (i) addressing the target set of databases with the input to retrieve target entries corresponding thereto and (ii) translating the sentence by directly substituting the target entries for the input.

12. The apparatus of claim 11 further comprising fourth database means comprising a series of entries establishing sets.

13. The apparatus of claim 12 wherein the analysis means is configured to ensure that the input conforms to a sentence constructed in accordance with expansion rules comprising:

a. to a nominal entry, add a descriptor entry from the third database means;

b. to a nominal entry, add a connector entry from the second database means and another nominal entry from the first database means;

c. to a nominal entry, add an entry from the fourth database means and another nominal entry from the first database; and d. to a descriptor entry, add an entry from the fourth database and another descriptor entry from the third database.

14. The apparatus of claim 12 wherein the fourth database means comprises the entries and, or.

15. The apparatus of claim 11 wherein the nominal entries name a person, place, thing, activity or idea.

16. The apparatus of claim 15 wherein the first database means includes the terms set forth in Table 2.

17. The apparatus of claim 11 wherein the connector entries show action, being or state of being.

18. The apparatus of claim 17 wherein the second database means includes the terms set forth in Table 3.

19. The apparatus of claim 11 wherein the descriptor entries describe a quality, quantity, state or type of a nominal entry.

20. The apparatus of claim 19 wherein the third database means includes the terms set forth in Table 4.

21. The apparatus of claim 11 further comprising a thesaurus for identifying, for an input term not matching any of the database entries, a database entry closest in meaning to the input term.

22. The apparatus of claim 11 further comprising means for displaying the translation.

* * * * *